(12) United States Patent
Madhavan et al.

(10) Patent No.: US 11,568,326 B2
(45) Date of Patent: Jan. 31, 2023

(54) LOCATION SENSITIVE ENSEMBLE CLASSIFIER

(71) Applicant: Microsoft Technology Licensing, LLC, Redmond, WA (US)

(72) Inventors: Ramanujam Madhavan, Karnataka (IN); Mohit Wadhwa, Delhi (IN)

(73) Assignee: Microsoft Technology Licensing, LLC, Redmond, WA (US)

(*) Notice: Subject to any disclaimer, the term of this patent is extended or adjusted under 35 U.S.C. 154(b) by 449 days.

(21) Appl. No.: 16/741,516

(22) Filed: Jan. 13, 2020

(65) Prior Publication Data
US 2021/0216916 A1 Jul. 15, 2021

(51) Int. Cl.
  *G06N 20/20* (2019.01)
  *G06F 16/901* (2019.01)
  *G06K 9/62* (2022.01)
(52) U.S. Cl.
  CPC ......... *G06N 20/20* (2019.01); *G06F 16/9014* (2019.01); *G06K 9/6267* (2013.01)
(58) Field of Classification Search
  CPC ... G06N 20/20; G06F 16/9014; G06K 9/6267
  See application file for complete search history.

(56) References Cited

U.S. PATENT DOCUMENTS

| | | | | |
|---|---|---|---|---|
| 8,589,404 | B1* | 11/2013 | Dunkelberger | G06F 16/9535 707/743 |
| 2005/0278322 | A1* | 12/2005 | Fan | G06N 20/20 707/999.005 |
| 2014/0052674 | A1* | 2/2014 | Aggarwal | G06N 20/00 706/12 |
| 2015/0154456 | A1* | 6/2015 | Pau | G06V 10/462 382/201 |
| 2019/0318269 | A1* | 10/2019 | Ezen Can | G06F 40/205 |
| 2020/0320354 | A1* | 10/2020 | Ghesu | G06K 9/6267 |

OTHER PUBLICATIONS

Dietterich, Thomas G., "Ensemble Methods in Machine Learning", In Proceedings of the First International Workshop on Multiple Classifier Systems, Jun. 21, 2000, pp. 1-15.
Rokach. Lior, "Collective Agreement-based Pruning of Ensembles", Dated Feb. 2019, 22 pages.
Caruana et al., "Ensemble Selection from Libraries of Models", Corrected version of the paper that appeared in the Proceedings of ICML'04, dated 2004, 9 pages.

* cited by examiner

*Primary Examiner* — Myron Wyche
(74) *Attorney, Agent, or Firm* — NDWE, LLP (57) ABSTRACT

Computer-implemented systems and methods for generating and using a location sensitive ensemble classifier for classifying content includes dividing a validation data set into regions. Each region encompasses data points of the validation data set that fall within the region. A regional ensemble classifier is generated for each region based on the data points that fall within the region. A content item is then classified in at least one of a plurality of classes using the regional ensemble classifier for the region to which the content item belongs.

20 Claims, 5 Drawing Sheets

Figure 5

LOCATION SENSITIVE ENSEMBLE CLASSIFIER

TECHNICAL FIELD

The present disclosure relates to machine learning ensemble classifiers.

BACKGROUND

Ensemble machine learning algorithms construct a set of machine learning classifiers (e.g., a logistic regression classifier, a decision tree classifier, a K-nearest neighbors classifier, etc.) and then classify a new data point based on an average, a weighted average, majority voting, weighted voting, etc., of individual predictions made by the classifiers of the ensemble. Early ensemble machine learning algorithms employed Bayesian averaging. More recent ensemble learning algorithms employ such techniques as error-correcting output coding, bagging, and boosting.

An ensemble classifier often performs better on a given machine learning classification task than any individual classifier does. Some reasons why an ensemble of classifiers may perform better than a single classifier include the statistical, computational, and the representational reasons discussed in the paper by Thomas G. Dietterich (2000), Ensemble Methods in Machine Learning, In J. Kittler and F. Roli (Ed.) First International Workshop on Multiple Classifier Systems, Lecture Notes in Computer Science (pp. 1-15). New York: Springer Verlag.

An ensemble classifier composed of too many classifiers (e.g., more classifiers than necessary to achieve acceptable accuracy) can result in large data storage requirements, raise interpretability issues, and even negate some of the benefits of using an ensemble classifier. To address this, an ensemble pruning method can be used to identify a subset of candidate machine learning classifiers such that the combination of the subset of classifiers in an ensemble results in desired classification performance. Some examples of ensemble pruning methods are described in the following papers: (1) Rich Caruana, Alexandru Niculescu-Mizil, Geoff Crew, Alex Ksikes, *Ensemble Selection from Libraries of Models*, Processing of the 21$^{st}$ International Conference on Machine Learning. Banff, Canada, 2004; and (2) Lior Rokach, Collective-agreement-based pruning of ensembles, Computational Statistics & Data Analysis, Vol. 53, Issue 4, Feb. 15, 2019, Pages 1015-1026.

One technical field in which ensemble classifiers are applied is content classification. For example, an ensemble classifier may be used to identify content as low-quality (e.g., spam). Low-quality content, such as spam, generally includes unwanted, unsolicited, or undesired content. Historically, spam encompassed unsolicited electronic mail messages. However, low-quality content more broadly encompasses other types of spam including, for example, instant messaging spam, newgroup spam, search engine spam, spam in online blogs, online wiki spam, online classified ad spam, mobile phone messaging spam, Internet forum spam, social or professional network spam including spam in online social or professional network content feeds, etc. While low-quality content is sometimes in the form of advertisements, low-quality content can include irrelevant, offensive, vulgar, violent, pornographic, adult, malware, phishing, false and misleading, fake news, hate speech, and other low-quality content.

The relevance (e.g., as measured by precision, recall, and accuracy metrics) of an ensemble classifier with respect to identifying low-quality content can affect an end-user's perception of the usability of an online service. Consider an example where an end-user of an online professional network system receives desired content in her or his scrollable professional networking content feed such as, for example, relevant job openings and interesting news and content feed items about colleagues and influencers in the end-user's professional network. The operator of the online professional network system may use an ensemble classifier to filter out low-quality content from the end-user's content feed. However, if the ensemble classifier has poor relevance in identifying low-quality content, then the end-user's content feed may be missing desired content that was incorrectly identified as low-quality content by the ensemble classifier or include low-quality content that the end-user is not interested in, or even repulsed by. In the first case, the ensemble classifier has poor precision with respect to identifying low-quality content. In the second case, the ensemble classifier has poor recall with respect to identifying low-quality content. In either case, the end-user may be dissatisfied with the online service.

Systems and methods described herein address this and other issues.

The approaches described in this section are approaches that could be pursued, but not necessarily approaches that have been previously conceived or pursued. Therefore, unless otherwise indicated, it should not be assumed that any of the approaches described in this section qualify as prior art, or are well-known, routine, or conventional, merely by virtue of their inclusion in this section.

DETAILED DESCRIPTION

In the following description, for the purposes of explanation, numerous specific details are set forth in order to provide a thorough understanding of various systems and methods for generating and using a location sensitive ensemble classifier. It will be apparent, however, that these systems and methods may be practiced without these specific details. In other instances, structures and devices are shown in block diagram form in order to avoid unnecessarily obscure aspects of the systems and methods.

Overview

According to some embodiments, computer-implemented systems and methods are provided for generating and using a location sensitive ensemble classifier for content classification, including, dividing a validation data set for a supervised machine learning content classification task into a region set. Each region of the region set encompasses data points of the validation data set that fall within the region. For example, the regions of the region set may be established by intersecting hyperplanes and applying a locality sensitive hashing method to the data points of the validation data set to assign the data points to the regions.

In some embodiments, a regional ensemble classifier is generated for each region of the region set that contains data points of the validation data set. The regional ensemble classifier is generated based on the validation data set data points that fall within the region. For example, the regional ensemble classifier may be generated by applying an ensemble pruning method to a general ensemble classifier composed of a set of candidate classifiers where the pruning is based on the validation data set points that fall within the region.

In some embodiments, the regional ensemble classifiers generated for regions of the region set are then used to classify content items in a location sensitive manner. In particular, given a test data point (e.g., feature vector) for a content item (e.g., text, image, photo, audio, video, or a combination thereof) to be classified, the region of the region set to which the test data point belongs is determined. The test data point is then classified (e.g., as low-quality) using the regional ensemble classifier generated for that region.

In some embodiments, the location sensitive ensemble classifier composed of the regional ensemble classifiers performs content classification tasks with improved relevance relative to a less localized ensemble classifier (e.g., the general ensemble classifier) that covers multiple regions. At the same time, the location sensitive ensemble classifier can be more optimally pruned thereby improving data storage requirements relative to the less localized ensemble classifier. In addition, the location sensitive ensemble classifier can provide improved classification interpretability relative to the less localized ensemble classifier.

In some embodiments, multiple different region sets composed of different sets of regions of the validation data set are determined. For example, the different region sets can be randomly generated. Each region set is evaluated for relevance in classification. A best region set of the region sets is selected based on its classification relevance. In particular, the region set's relevance can be measured based on precision scores, recall scores, and/or F1 scores for the regional ensemble classifiers generated for the regions of the region set. In doing so, each of the regional ensemble classifiers is scored based on the validation data set points that fall within the respective region. In this way, exploration for a best region set among multiple candidate region sets is accomplished.

Content Classification

In some embodiments, the relevance (e.g., precision, recall, and/or accuracy) of an ensemble classifier with respect to identifying low-quality content has a significant effect on an end-user's perception of the usability of an online service. Unfortunately, low-quality content is myriad and varies in characteristics that constantly evolve across many different categories of low-quality content. So, exploring for a relevant ensemble among a set of candidate classifiers is needed. Along with the need for exploration, there is a need for ensemble interpretability such that content classifications are explainable to end-users of the online service and to those that operate the online service.

According to some embodiments, systems and methods disclosed herein provide improved classification relevance, improved classification interpretability, and/or improved (reduced) data storage requirements, using a regional ensemble construction approach that divides a validation data set into regions, collectively termed a "region set," and constructs a regional ensemble classifier for each region in the region set based on the data points of the validation data set that fall within the region. The overall relevance of regional ensemble classifiers constructed for the region set may then be measured. This may be repeated for different region sets (different divisions of the validation data set into regions) and the set of regional ensemble classifiers constructed for the region set with the best relevance may be selected to classify content.

In some embodiments, the systems and methods provide improved classification relevance relative to a less localized ensemble classifier covering multiple regions because content is classified using the regional ensemble classifier generated for the region to which the content belongs, and the regional ensemble classifiers tend to be better experts in classifying content that falls within their respective regions.

In some embodiments, the systems and methods provide improved classification interpretability relative to a less localized ensemble classifier covering multiple regions because content is classified using the regional ensemble classifier generated for the region to which the content belongs, and, as such, a classification decision for the content is confined to the more localized regional ensemble classifier, thereby improving (reducing) the scope of understanding, investigating, or troubleshooting the classification decision for technical personnel.

In some embodiments, the systems and methods provide improved (reduced) data storage requirements relative to a less localized ensemble classifier covering multiple regions because ensemble pruning is localized to each region such that more optimal pruning is possible within each region. As a result, fewer distinct component classifiers may be used by all of the regional ensemble classifiers than would be used by the less localized ensemble classifier.

As an example of the problem addressed by the systems and methods herein in some embodiments, consider an online professional or social network content feed presenting selected content items to end-users in an online professional or social network system. The online system may select content items to present in the content feeds from content items that are published to the system by other end-users (e.g., individuals or businesses or other organizations). Such content items may include news items, job postings, advertisements, comments, posts, or other discrete text or media items (e.g., text, audio, images, photos, video, or a combination thereof) that appear in the end-users' online social or professional network content feeds. Such content items can be of varying types and of varying quality (relevancy).

It is a technical challenge for these systems to identify low-quality content items that should not be presented to end-users in their content feeds precisely because there is no precise definition or rule for identifying low-quality content. Thus, in filtering out such content items from presentation in content feeds, the systems may over filter content items that are not of low-quality or under filter content items that are of low-quality. As such, relevance in identifying low-quality content is very important.

Relevance in identifying low-quality content is not only important for online social and professional network system operators, which depend on end-user engagement with the system, but also to the end-users themselves who will appreciate that the content items presented to them in their content feeds are comprehensive and relevant. If low-quality content is served in a content feed, the end-user might perceive the system as providing a poor user experience. There may have been better quality content that could have been served. If high-quality content is not served to the end-user because it is incorrectly identified as low-quality, then an opportunity for the system to increase the level of engagement with the end-user might have been missed.

In some embodiments, the systems and methods provide for improved relevance in classifying content as low-quality. Further, as alluded to above, the systems and methods can be applied to more than just social or professional network content feeds. In addition to, or alternatively, they can be used for many different types of content classification tasks, such as classifying online comments, survey feedback, digital photos, digital images, electronic mail messages, and the like. Content classification can be binary (e.g., spam or not spam/low-quality or not low-quality) or multi-class (e.g., regular, informational, advertisement, fraud, etc.).

In some embodiments, the systems and methods herein use a location sensitive ensemble approach in which content classifications are made by regional ensemble classifiers. Each regional ensemble classifier is generated based on a respective region of a validation data set. Content is classified by the regional ensemble classifier generated from the region to which the content belongs. By doing so, the classification is made with improved relevance compared to a less localized ensemble classifier covering multiple regions due to less dilution of prediction because, as a result of the systems and methods, the regional ensemble classifier tends to be more of an expert in classifying content in its region.

In some embodiments, the systems and methods proceed by dividing a validation data set into a region set. For example, the validation data set may be a holdout portion of a labeled training data set used to train candidate classifiers in a supervised machine learning manner for a content classification task. The region set divides the data points of validation data set into multiple regions where each region encompasses data points of the validation data set that correspond to similar content. For reach region containing data points of the validation data set, a regional ensemble classifier is generated based on the validation data set data points that fall within the region. Test data points are classified using the respective regional ensemble classifier of the region to which the test data points belong. The result is that the test data points (e.g., test data points for content feed content items) can be classified with improved relevance compared to a less localized ensemble classifier encompassing multiple regions.

In some embodiments, the systems and methods herein are repeated for different region sets (e.g., randomly selected region sets) to determine the region set with the best relevance as measured by precision, recall, and/or F1 score of the regional ensemble classifiers of the region set on the data points of the validation data set that fall within the respective regions.

Figure 1:
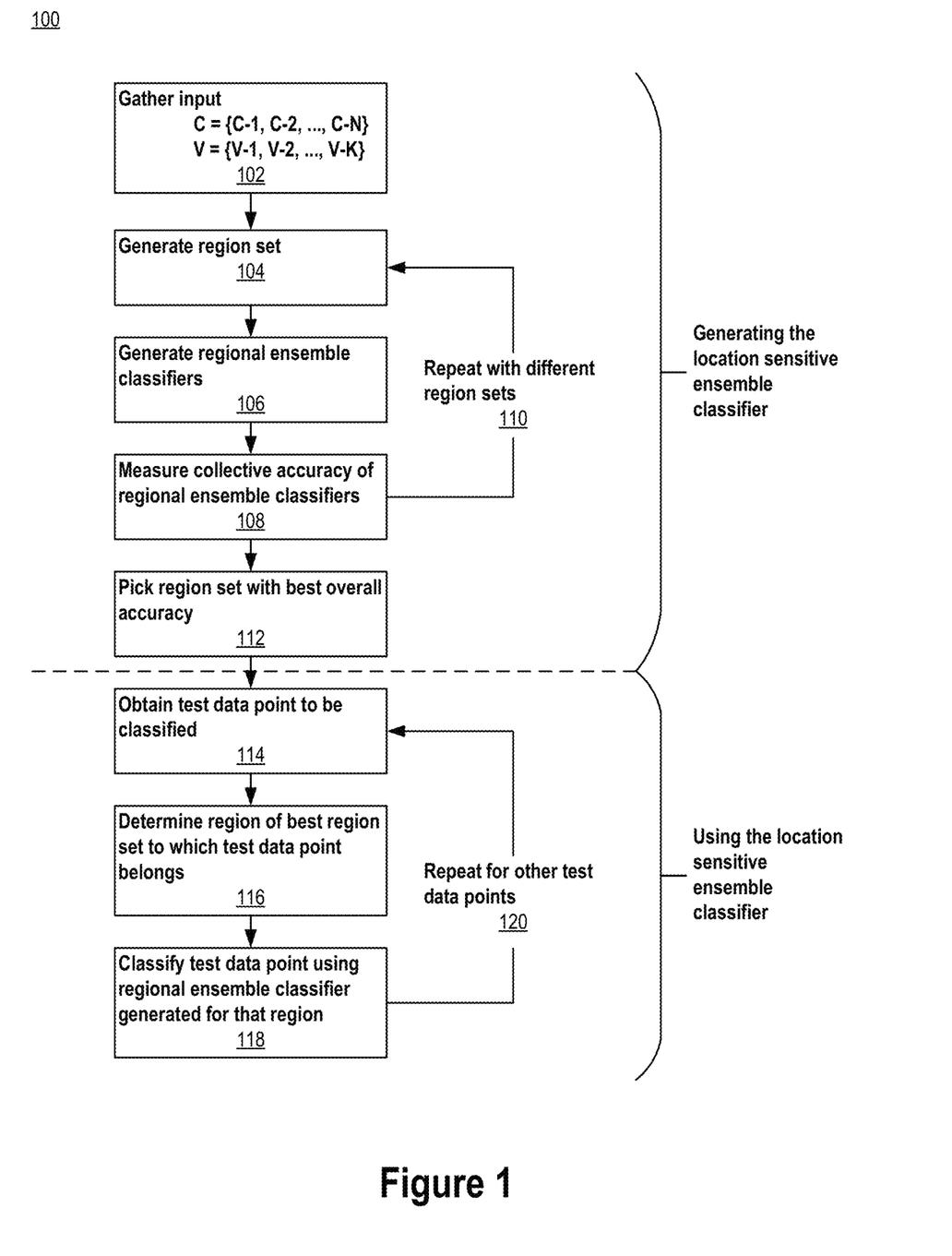
FIG. 1 depicts an example process for generating and using a location sensitive ensemble classifier.

Example Process for Generating and Using a Location Sensitive Ensemble Classifer for Classifying Content FIG. 1 illustrates example process 100 for generating (102, 104, 106, 108, 110, and 112) a location sensitive ensemble classifier and using (114, 116, 118, and 120) the location sensitive ensemble classifier for classifying content, according to some embodiments.

In some embodiments, in summary, process 100 proceeds by gathering 102 input including a general ensemble classifier C composed of candidate classifiers C-1, C-2, C-N and a validation data set V encompassing data points V-1, V-2, V-K. A region set is generated 104 where the region set divides the validation data set V into multiple regions. Each of the regions may encompass data points of the validation data set V where a data point belongs to at most one of the regions.

In some embodiments, once the validation data set V is divided into the region set, a regional ensemble classifier is generated 106 for each region of the region set containing data points based on the data points of the validation data set V that fall within the region. For example, for each region of the region set containing data points of the validation data set V, a regional ensemble classifier may be generated for the region based only on all the data points in the region (or a substantial subset thereof) and not based on any data points in other regions (or based on only a relatively small number of data points in other regions). As another example, a regional ensemble classifier may be generated for its region based on a substantial subset of all the data points in the region (e.g., a subset that excludes statistical outliers) and not based on any data points in other regions or based on only a relatively small number of data points in other regions (e.g., data points in other regions near the border of the region).

In some embodiments, each regional ensemble classifier is an ensemble of one or more of the candidate classifiers C-1, C-2, C-N that make up the general ensemble classifier C. As explained below, a regional ensemble classifier generated for a region may be composed of more than one candidate classifier. However, a regional ensemble classifier may be composed of only one candidate classifier after ensemble pruning is performed on the general ensemble classifier C based on the data points of the validation data set V that fall within the region.

The overall relevance of the set of regional ensemble classifiers generated 106 for the region set is measured 108. In some embodiments, operations 104, 106, and 108 are repeated 110 with different randomly selected region sets until an adequate set of regional ensemble classifiers is generated. For example, the operations may be repeated 110 until a set with a measured 108 collective relevance above a minimum threshold is identified. As another example, the operations may be repeated 110 for a number of iterations (e.g., for ten iterations). In this case where the operations are repeated 110 for some number of iterations, the regional ensemble classifiers of the region set with the best measured 108 overall relevance are selected 112 to use as a location sensitive ensemble classifier for classifying content.

It should be noted that the location ensemble classifier may be viewed in some embodiments as an ensemble of ensembles. More specifically, an ensemble of the regional ensemble classifiers generated for the selected region set.

In some embodiments, each of the regional ensemble classifiers combines the individual predictions of their component classifiers into an overall prediction using a variety of different techniques and no particular combining technique is required so long as the same combining technique is used when generating the location sensitive ensemble classifier and when using the location ensemble classifier. For example, the individual predictions can be aggregated (e.g., average, a weighted average, majority voting, weighted voting, Bayesian average, etc.) into the overall prediction.

In some embodiments, when a test data point for content to be classified is obtained 114, the region of the most relevant region set to which the test data point belongs is determined 116 and the content is classified 118 using the regional ensemble classifier generated for that region. Operations 114, 116, and 118 may be repeated 120 for different content items to be classified.

As an example, consider text content authored by an end-user of an online service. For example, the text content might be a tweet, a professional or social network post, an online survey response, an online comment, etc. This text content might be published by the online service to other end-users. The online service might wish to identify text content that is low-quality (e.g., irrelevant, vulgar, offensive, spam, etc.) before it is published so that it can be withheld (not published). Process 100 may be used to identify the low-quality content with high relevance. The system depicted in FIG. 2 (and/or the computing device in FIG. 5) may be used to implement process 100 and other embodiments herein.

Figure 2:
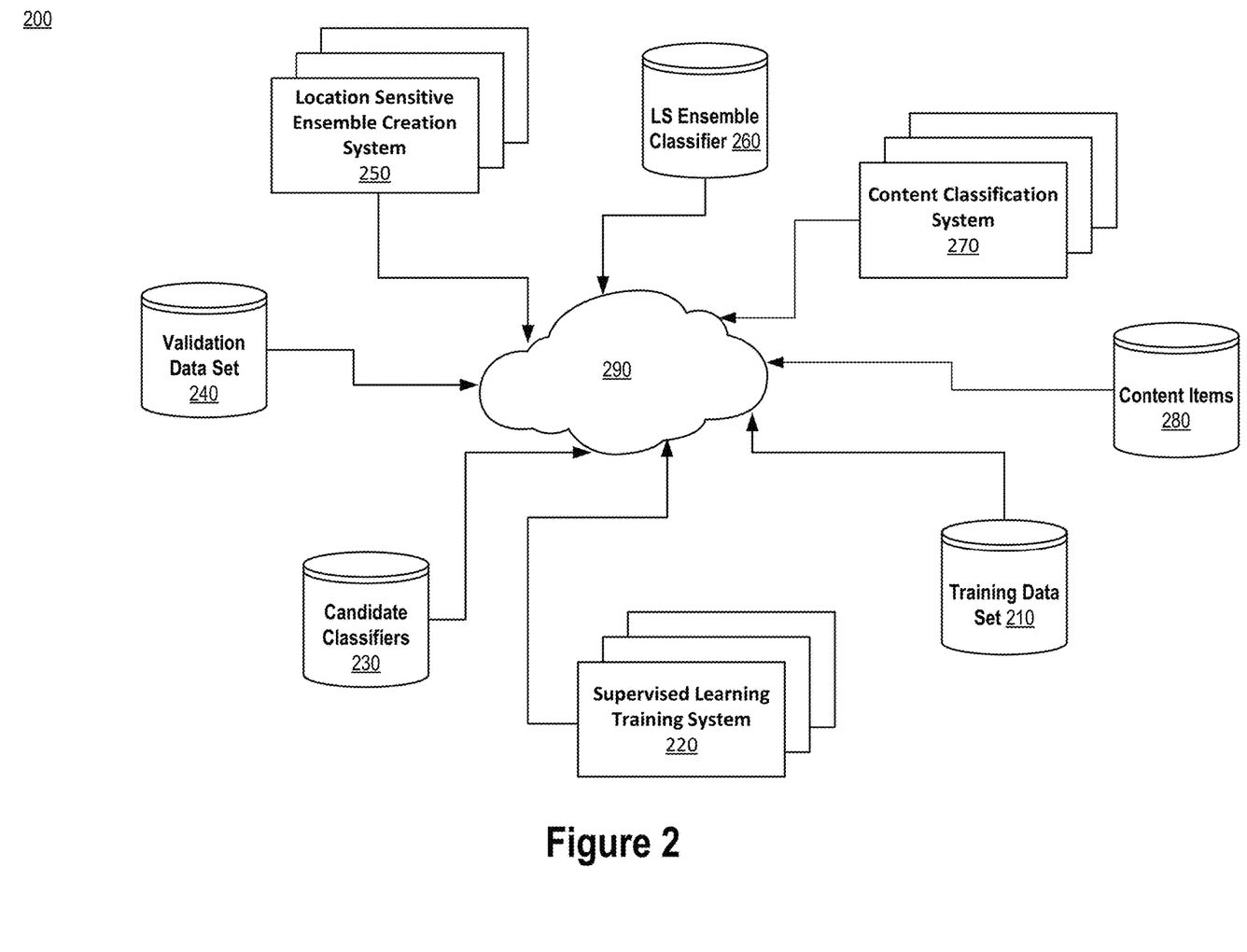
FIG. 2 depicts an example system for generating and using a location sensitive ensemble classifier.

As another example, an electronic mail system may incorporate a spam filter for identifying and flagging electronic mail messages as spam among e-mail messages some of which would be considered by a recipient as spam and some of which would not be considered by a recipient as spam. Process 100 and system 200 may be used to determine which electronic mail messages are spam consequently should be quarantined.

As yet another example, digital photo or digital video content uploaded by end-users to a photo or video-sharing online service may use process 100 and system 200 to identify and withhold low-quality photos or videos from publication (e.g., in content feeds) by the service to other end-users.

In many of the examples herein, a location sensitive ensemble classifier is generated and used for identifying low-quality content among content of varying quality. In some embodiments, a location sensitive ensemble classifier may be generated and used for other classification tasks. For example, a location sensitive ensemble classifier may be generated and used for fraud detection, optical character recognition, machine vision (e.g., for face detection), natural-language processing (e.g., for spoken language understanding), market segmentation (e.g., to predict if a customer will response to a promotion), bioinformatics (e.g., to classify proteins according to their functions), etc. Further, a regional ensemble classifier can be composed of different types of one or more classifiers (e.g., a logic regression classifier, a support vector machine classifier, a random forest classifier, a K-nearest neighbor classifier, etc.) The predictions of each component classifier of the regional ensemble classifier can be combined in different ways including, for example, by averaging (e.g., Bayesian averaging or weighted Bayesian averaging) or by hard voting (e.g., majority-voting or weighted voting). The regional ensemble classifier may incorporate bagging and pasting, boosting (e.g., AdaBoost, gradient boosting, etc.), stacking, or other ensemble training techniques.

Returning to the top of process 100, a general ensemble classifier C and a validation data set V is gathered 102. Gathering the general ensemble classifier C and the validation data set V may take any appropriate form. In some embodiments, the general ensemble classifier C is stored as one or more files or in one or more other suitable data storage containers containing the machine learning model-specific parameters and hyperparameters on computer storage media. For example, the machine learning model hyperparameters for a logistic regression model may encompass parameters that indicate regularization strength (e.g., 1/60), the norm used in the penalization (e.g., the L2 norm), thresholds, or other appropriate logistic regression hyperparameters. As another example, the machine learning model hyperparameters for a K-nearest neighbors model may include parameters that indicate the number of neighbors to use by default for k-neighbors queries (e.g., 2), thresholds, or other appropriate K-nearest neighbors hyperparameters. As yet another example, the machine learning model hyperparameters for a decision tree model may encompass parameters that indicate the function to measure the quality of a split (e.g., gini), the maximum depth of the tree (e.g., 2), thresholds, or other appropriate decision tree hyperparameters.

In some embodiments, likewise, the validation data set V is stored on computer storage media. The set of trained candidate classifiers C-1, C-2, C-N may be stored in attached storage 230 or cloud storage 230, at storage local to supervised learning training system 220 and location sensitive ensemble creation system 250, or in any other appropriate location. Likewise, the validation data set V may be stored in attached storage 240 or cloud storage 240, at storage local to location sensitive ensemble creation system 250, or in any other appropriate location.

In some embodiments, as indicated, the general ensemble classifier C encompasses various different types of machine learning classifiers. For example, the general ensemble classifier C may be composed of a logistic regression classifier, a K-nearest neighbor classifier, and a decision tree classifier. However, the set of candidate classifiers C-1, C-2, C-N are not limited to these types of machine learning classifiers and other types of machine learning classifiers may be used (e.g., a support vector machine classifier, a naïve Bayes classifier, etc.). Further, there may be as few as two candidate classifiers or more than three candidate classifiers. For example, there may be tens or hundreds of candidate classifiers. While the general ensemble classifier C may be composed of different types of machine learning classifiers, it is also possible for the general ensemble classifier C to be composed of the same type of machine learning classifier but each with different hyperparameters. For example, the general ensemble classifier C can be composed of a number of decision trees with different tree depths.

In some embodiments, the general ensemble classifier C is trained in a supervised learning manner based on a training data set T such that the general ensemble classifier C is able to generalize well to unseen test examples (e.g., have mean relevance (e.g., precision, recall, and/or F1 score) on a set of test examples above 80%, or any other appropriate threshold). In some embodiments, each component classifier of the general ensemble classifier C is trained individually based on the training data set T and their predictions combined based on averaging of voting as indicated elsewhere herein (e.g., the individual predictions combined as an average, a weighted average, majority voting, weighted voting, Bayesian average, etc.). However, training the general ensemble classifier C may involve more sophisticated ensemble training techniques such as, for example, bagging, pasting, boosting (e.g., AdaBoost, gradient boosting, etc.), stacking, etc. No particular method of training the general ensemble C is required. Further, the general ensemble classifier C may itself by the product of ensemble pruning. For example, the general ensemble classifier C may result from pruning an initial general ensemble classifier based on the entire validation data set V such that the general ensemble classifier C is composed of a subset of the component classifiers of the initial ensemble classifier.

In some embodiments, the training examples vary depending on the type of machine learning task for which the general ensemble classifier C is being trained. For example, for a content classification task, the training examples may include feature vectors for content items that are representative of content to be classified including both positive training examples of low-quality content and training negative examples of low-quality content. The labels may also vary depend on the type of machine classification task. The labels may belong to a binary class or a multi-class. For example, for a content classification task, the training data set T may label the training examples with binary labels such as, for example, SPAM or NOT SPAM, or, alternatively, LOW-QUALITY or CLEAR, or the like. In the binary label case, one of the two possible labels may be a positive label (e.g., SPAM, LOW-QUALITY, etc.) indicating that the corresponding training example is a positive example of low-quality content, and the other of the two possible labels may be a negative label (e.g., NOT SPAM, CLEAR, etc.) indicating that the corresponding training example is a negative example of low-quality content. Multi-class labels may also be used. The multi-class labels may include positive labels (e.g., IRRELEVANT, NUDE, FAKE NEWS, PROFANITY, PERSONAL PLEA, SELF PROMOTION, ADULT, MALWARE, PHISHING, GRATUITOUSLY SHOCKING, HARRASSMENT, HATE SPECH, etc.) for positive training examples of low-quality content and negative labels (e.g., CLEAR, LITERATURE, LESIURE, EDUCATION, ANIMALS, DISCUSSION, etc.) for negative training examples of low-quality content.

Turning briefly to FIG. 2, which is discussed more below, note that systems 220, 250, and 270 are discussed as separate entities for simplicity. Two or more of systems 220, 250, and 270 may be implemented as the same system and/or any of systems 220, 250, and 270 may include multiple systems.

In some embodiments, validation data set V encompasses a holdout portion of training data set T. For example, a validation data set V may encompass one or more portions of training data set T where each such portion is not used by supervised learning training system 220 to train the general ensemble classifier C (although a portion may be used by supervised learning training system 220 to train some but not all the candidate classifiers as in a cross-validation scheme).

In some embodiments, validation data set V is composed of labeled representative training examples like training data set T. Validation data set V may include both positive and negative training examples. The labels of validation data set V may be binary labels or multi-class labels, like the training data set T. For example, in the low-quality content classification context, the training data set T, the validation data set V, and a test data set may each may encompass approximately ten thousand (10,000) positive training examples of low-quality content and approximately twenty-five hundred (2,500) negative training examples of low-quality content from an original training data set that is distributed among the training data set T, the validation data set V, and the test data set. Other distribution ratios are possible, and embodiments are not limited to any particular distribution ratio including among the training, validation, and test data sets. Nor is any particular ratio of positive training examples to negative examples for a particular data set required. It is also possible to use an original training data set with a smaller or larger number of labeled training examples. For example, an original training data set having hundreds of thousands or millions of training examples may be used.

In some embodiments, once the general ensemble classifier C and the validation data set V are gathered 102 (e.g., on storage media 230 and 240), then process 100 generates 102 a region set. A region set divides the data points of the validation data set V into multiple regions where each data point of the validation data set V belongs to at most one of the regions and each of the regions contains similar data points. The validation data set V is divided into regions of similar data points so that respective location sensitive regional ensemble classifiers can be generated for the regions. The regional ensemble classifiers are location sensitive in the sense that they are each generated based on the data points of the validation data set V that fall within the region from which it is generated. In this way, each regional ensemble classifier tends to be a better expert in classifying content items that are similar to the content items in the region from which it is generated compared to a less localized ensemble classifier encompassing multiple regions.

In some embodiments, for computational efficiency, to avoid comparing each data point to every other data point of the validation data set V, data point similarity may be based on probability. For example, a region set may be generated 102 that divides the validation data set V into regions of data points such that it is highly probable (e.g., more probable than a minimum threshold probability) that data points for content items that have similar content are assigned to the same region. One way to do this is to use a locality sensitive hashing method with random projections (e.g., random hyperplanes). An example locality sensitive hashing method for efficiently generating 102 a region set is illustrated in FIG. 3.

Figure 3:
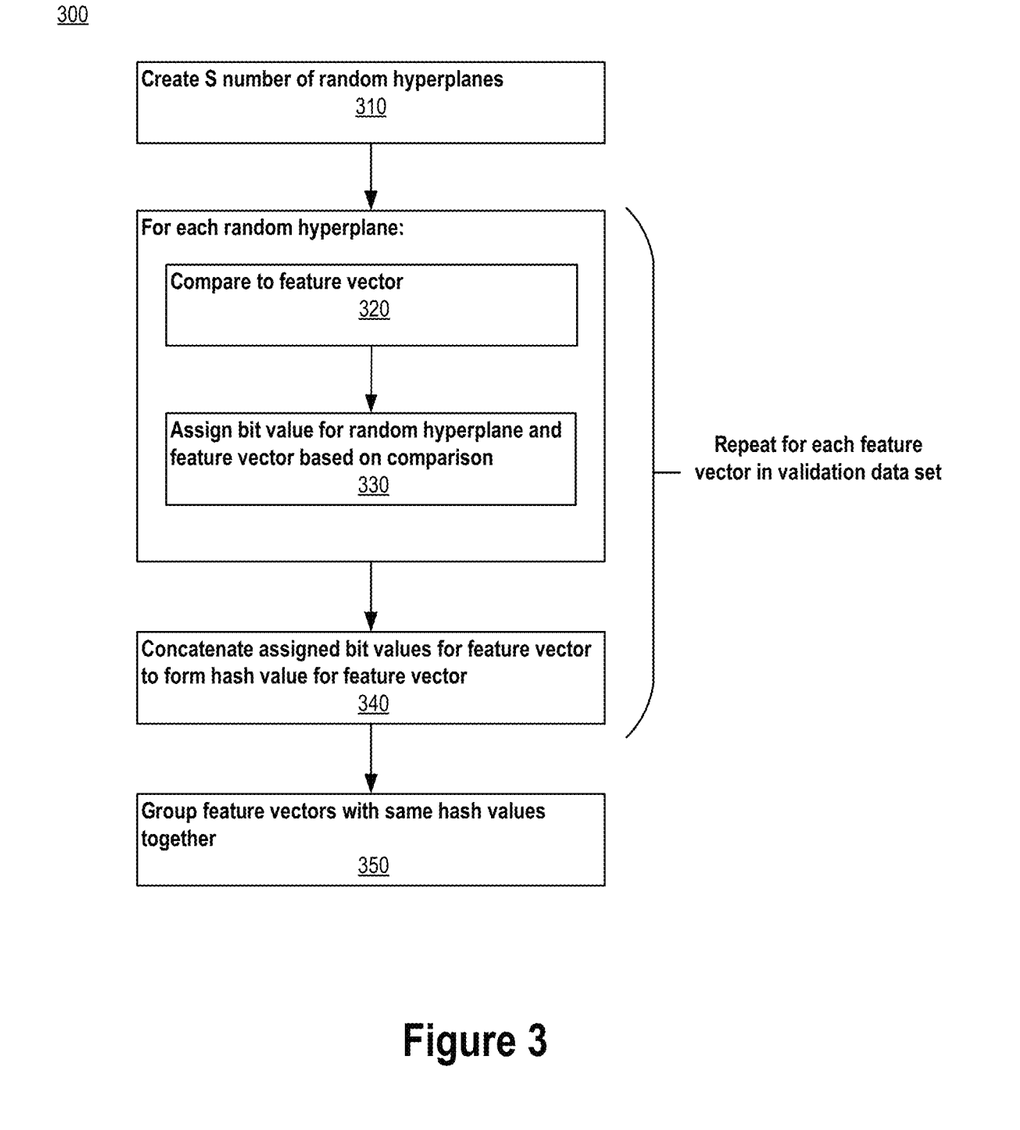
FIG. 3 depicts an example locality sensitive hashing method for generating a region set.

The method 300 of FIG. 3 includes generating 310 a set of random hyperplanes H={H-1, H-2, . . . , H-S}. A hyperplane may be defined as a vector of randomly generated coefficients. The dimensionality of the hyperplane vector can equal the dimensionality of the feature vector data points of the validation data set V. The feature vectors are numerical such as, for example, one-hot vectors or vectors of real numbers. Both the hyperplane vectors and the feature vectors may be normalized as unit vectors.

In some embodiments, each feature vector numerically represents various features of or associated with a corresponding training example (e.g., a content item). No particular features are required, and the features encoded by the feature vectors may vary from implementation to implementation according to the requirements of the particular implementation at hand. For example, for a content classification task, the features encoded by the feature vectors of the validation data set T may vary depending on the type of content items expected to be classified. For example, if text content items are expected to be classified, then the features encoded by the feature vectors may pertain to text or character or word features of the text. Likewise, if animals pictured in digital images are expected to be classified, then the features encoded by the feature vector may pertain to various detectable image features predictive of a type of animal pictured in the image. These are just two of many possible examples.

In some embodiments, five or so hyperplanes are randomly generated. However, more than five or fewer that five hyperplanes can be randomly generated. The number of hyperplanes generated determines the bit-length of the hash values generated by method 300 for each data point of the validation data set V. Typically, the number of hyperplanes is much less than the dimensionality of the feature vectors of the validation data set V. Nonetheless, the method 300 of FIG. 3 projects the higher dimensional feature vectors of the validation data set V into suitable lower dimensional hash values in a way that approximately preserves the distance between the feature vectors in a vector space, thereby providing a form of approximate similarity preserving dimensionality reduction.

In some embodiments, the intersection of the randomly generated hyperplanes forms the region set. Given a feature vector of the validation data set V, the feature vector is compared 320 to each of the S number of randomly generated hyperplanes. A bit value (i.e., one or zero) is assigned 330 for the feature vector and the hyperplane depending on which "side" of the hyperplane the feature vector lies on. For example, if the feature vector lies "above" the hyperplane, then a bit value of one (1) may be assigned 330. On the other hand, if the feature vector lies "below" the hyperplane, then a bit value of zero (0) may be assigned 330. One possible way to determine whether the feature vector lies above or below the hyperplane is to compute the dot product of the feature vector and the hyperplane after normalizing both vectors as unit vectors as necessary. If the result of the dot product is a positive value, then the feature vector is above the hyperplane and, accordingly, a bit value of one is assigned 330. On the other hand, if the result of the dot product is a negative value, then the feature vector is below the hyperplane and, consequently, a bit value of zero is assigned 330. It should be noted that "above" corresponding to a bit value of one (1) and "below" corresponding to a bit value of zero (0) could be reversed in an implementation. The result of comparing 320 the feature vector to each randomly generated hyperplane and assigning 330 a bit value for the feature vector and each randomly generated hyperplane based on the comparisons 320 is S number of bit values generated for the feature vector. These bit values are then concatenated 340 to form a hash value for the feature value. When concatenating 340, the bit values may be concatenated in a fixed order of the hyperplanes which may, but is not required to, correspond to an order in which the feature vector is compared 320 against the S number of random hyperplanes. Operations 320, 330, and 340 are repeated for each feature vector of the validation data set V.

It is possible for the dot product of a hyperplane and a feature vector to be zero. In this case, the feature vector can be considered above or below the hyperplane where the choice of above or below can be made according to the requirements of the particular implementation at hand so long as the choice is consistently made when generating the location sensitive and when using the location sensitive ensemble.

In some embodiments, once hash values have been computed 340 for all of the feature vectors of the validation data set V, then all of the feature vectors can be grouped together into regions according to the hash values. In particular, all features vectors having the same computed 340 hash value belong to the same region. In this way, a region set of regions is formed by the intersection of the randomly generated hyperplanes and each feature vector of the validation data set V is assigned to one region of the region set with a high probability that similar feature vectors are assigned to the same region.

While in some embodiments a locality sensitive hashing method is used to generate 104 a region set, a clustering technique is used to generate 104 a region set in some embodiments. For example, the clustering technique can be a flat clustering technique (e.g., K-means), a top-down or divisive clustering technique, or other suitable clustering technique for forming clusters (regions) of similar validation data set points.

Returning now to FIG. 1, once a region set is generated 104, then regional ensemble classifiers are generated for each region of the region set. In particular, for a given region, an ensemble pruning method is applied to the general ensemble classifier C using the data points of the validation data set V that belong to the region. In this way, duplicate or similar classifiers of the general ensemble classifier C can be removed such that a more diverse regional ensemble classifier may result. Since the data points of the validation data set V are divided into multiple regions and data points assigned to the same region have a high probability of being similar as a result of the locality sensitive hashing method 300, the classifiers of the general ensemble classifier C which are similar to each other (e.g., similar hyperparameters) would perform similar in terms of relevance on the data points in a given region and consequently removed by pruning, resulting in a more diverse regional ensemble classifier for the given region than the general ensemble classifier C.

Various different ensemble pruning methods may be used and no particular ensemble pruning method is required so long as the pruning of the general ensemble classifier C for a given region is based on the data points of the validation data set V that are assigned to the region. A goal of ensemble pruning the general ensemble classifier C with respect to a given region may be to identify a subset of the component classifiers that make up the general ensemble classifier C that performs at least as well on the data points of the validation data set V in the given region and discard any other component classifiers as redundant classifiers for the given region. Ensemble pruning methods typically adhere to one of two approaches: a ranking-based approach or a search-based approach. With a ranking-based approach, the individual component classifiers of the general ensemble classifier C are ranked according to a classification performance criterion and the top-ranking component classifiers are chosen according to a threshold. With a search-based approach, instead of separately ranking the component classifiers, a heuristic search is performed in the space of possible different ensemble subsets while evaluating the collective merit of a candidate subset. In some embodiments, the ensemble pruning method used to prune the general ensemble classifier C for a given region is the collective agreement-based method described in the paper by Lior Rokach, Collective-agreement-based pruning of ensembles, Computational Statistics & Data Analysis, Vol. 53, Issue 4, Feb. 15, 2019, Pages 1015-1026, the entire contents of which is hereby incorporated by reference. Another possible ensemble pruning method is to treat the component classifiers of the general ensemble classifier C as a library of individual classifiers, start with an empty regional ensemble classifier, and then select component classifiers to add to the regional ensemble classifier from the library, in accordance with the ensemble selection approach described in the paper Rich Caruana, Alexandru Niculescu-Mizil, Geoff Crew, Alex Ksikes, *Ensemble Selection from Libraries of Models*, Processing of the $21^{st}$ International Conference on Machine Learning. Banff, Canada, 2004, the entire contents of which is hereby incorporated by reference.

Figure 4A:
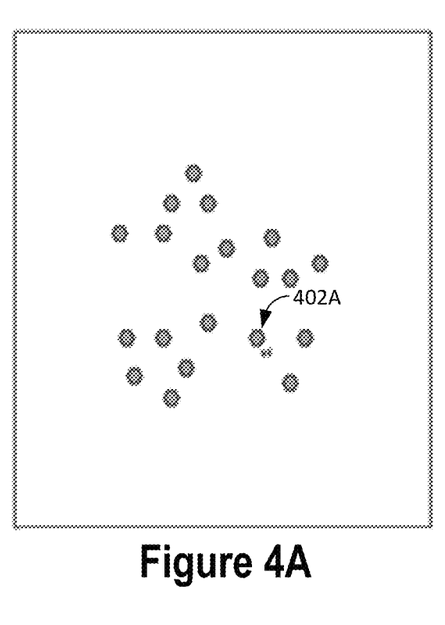
FIG. 4A depicts validation data set data points.
Figure 4B:
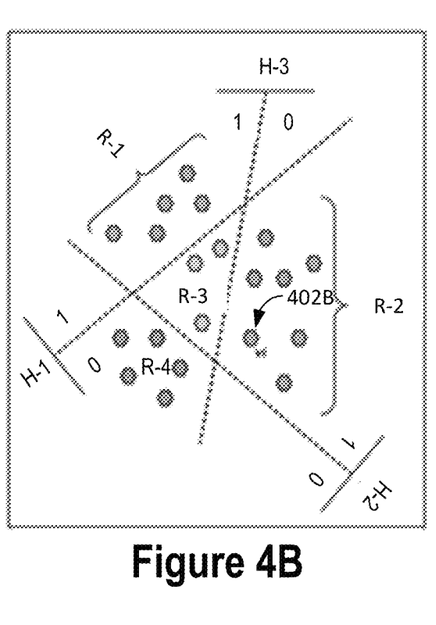
FIG. 4B depicts regions of the validation data set data points defined by intersecting hyperplanes.
Figure 4C:
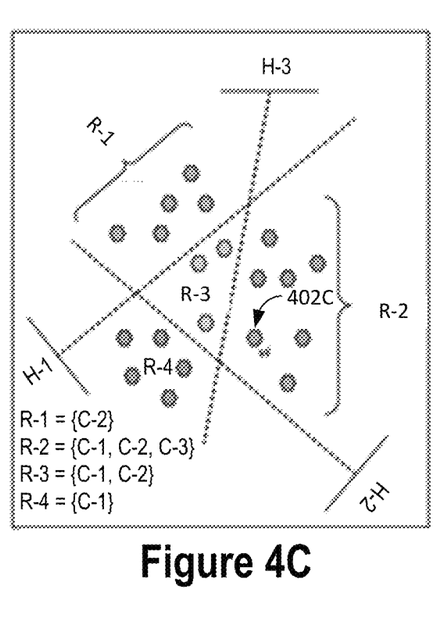
FIG. 4C depicts regional ensemble classifiers generated for each region defined by the intersecting hyperplanes.

FIGS. 4A, 4B, and 4C illustrate an example of generating a region set and generating regional ensemble classifiers for regions of the region set, according to some embodiments. The example is provided for purposes of illustration such that one skilled in the art, informed by this disclosure, can apply the techniques herein in a particular implementation which may involve a larger validation data set, more regions, and more hyperplanes.

FIG. 4A illustrates data points of a validation data set of which data point 402A is one of the data points. The data points are presented in a two-dimensional space for purposes of illustration only. In a practical embodiment, however, the data points may be projected in a multi-dimensional hyperspace.

FIG. 4B shows the projection of three random hyperplanes H-1, H-2, and H-3 and data point 402B corresponding to data point 402A. Since the toy example is presented a two-dimensional space, the hyperplanes are depicted as lines for purposes of illustration only. The intersection of the hyperplanes forms four regions R-1, R-2, R-3, and R4, each encompassing data points of the validation data set. According to the locality sensitive hashing method 300, all data points in a region are assigned the same hash value. Since there are three hyperplanes, each hash value is three-bits. For example, all of the data points in region R-4 may be assigned the hash value 0 0 1 because the data points are below hyperplane H-1, below hyperplane H-2, and above hyperplane H-3. Because of the nature of the locality sensitive hashing method 300, all data points in the same region have a high probability of being similar (e.g., representing similar content).

FIG. 4C shows result of the generating regional ensemble classifiers for each region R-1, R-2, R-3, and R-4 and data point 402C corresponding to data point 402A. For example, the set of candidate classifiers of the general ensemble classifier might include four candidate classifiers C-1, C-2, C-3, and C-4. In this example, the regional ensemble classifier generated for region R-1 is composed of candidate classifier C-2, the regional ensemble classifier for region R-2 is composed of candidate classifiers C-1, C-2, and C-3, the regional ensemble classifier for region R-3 is composed of candidate classifier C-1 and C-2, and the regional ensemble classifier for region R-4 is composed of candidate classifier C-1. After ensemble pruning the set of candidate classifiers for each region, the total number (3) of distinct component classifiers of the regional ensembles is fewer than the number (4) of original candidate classifiers of the general ensemble classifier, thereby improving data storage requirements relative to the general ensemble classifier. This fewer number of component classifiers may also be fewer than the number of component classifiers of the general ensemble classifier pruned based on all of the data points of the validation data set if no pruning opportunities are identified. More pruning opportunities may be identified with the regional ensemble construction approach because of the greater degree of similarity of the data points in each region on which each regional ensemble classifier is respectively generated.

Returning now to FIG. 1, after the regional ensemble classifiers are generated 106 for the regions of the current region set 104, the collective relevance of the regional ensemble classifiers is measured 108. In particular, each data point of the validation data set V is classified using the regional ensemble classifier generated 106 for the region to which the data point belongs. Based on the results of classifying each data point as such, the overall relevance (precision, recall, and/or F1 score) of the regional ensemble classifiers generated 106 for the current region set 104 is measured. For example, the precision in identifying low-quality content can be measured as the fraction of data points classified by the regional ensemble classifiers as low-quality that are actually low-quality according to the labels in the validation data set associated with the classified data points. The recall in identifying low-quality content can be measured as the fraction of all data points in the validation data set that are low-quality according to the labels in the validation data set that are correctly classified as low-quality by the regional ensemble classifiers. The F1 score may be computed as the harmonic mean of precision and recall as just defined. Other relevance metrics based on precision, recall, and/or accuracy may be used and not particular metric or set of metric for measuring relevancy is required.

Operations 104, 106, and 108 may be repeated 110 for different region sets (e.g., different sets of randomly generated hyperplanes). The operations may be repeated 110 for a predetermined number of iterations (e.g., ten). However, more then ten iterations or fewer than ten iterations may be performed according to the requirements of the particular implementation at hand.

At operation 112, of all the region sets generated the best region set is selected. More specifically, the regional ensemble classifiers generated for the best region set are selected. The selection may be based on the overall relevance measurements for the region sets generated. For example, the region set with the best F1 score may be selected. Or of all the region sets with a measured precision above a threshold (e.g., 80%), the region set with the best recall of those region sets may be selected.

In some embodiments, once the best region set of regional ensemble classifiers is selected, tests data points (e.g., feature vectors for content items to be classified) are classified. In particular, when a test data point is obtained 114, the region of the best region set to which the test data point belongs is determined 116. This determination may be made by computing a hash value for the test data point according to the locality sensitive hashing method 300 by comparing 320 the test data point to each of the randomly generated hyperplanes for the best region set and assigning 330 and concatenating 340 bit values based on which side of the hyperplanes the test data point lies. The hash value of the region of the best region that matches the computed hash value for the test data point is the region to which the test data point belongs. The test data point is then classified (e.g., as low-quality content) using the regional ensemble classifier generated for the determined 116 region. Operations 114, 116, and 118 may be repeated 120 to classify other test data points.

It should be noted that it is possible to generate 104 a region set where one or more of the regions does not contain a data point of the validation data set V. For example, if the region set is generated 104 based on randomly generating hyperplanes, then it is possible that one or more of the regions formed by the intersection of the hyperplanes does not contain a data point of the validation data set V. For such a region, no regional ensemble classifier may be generated 106. If a test data point is determined 116 to fall within such a region, then the test data point may be classified using the more general ensemble classifier C, or otherwise classified, as no regional ensemble classifier was generated 106 for the region.

Computing System Implementation

In some embodiments, a computing system (e.g., computing device 500) includes one or more processors and storage media coupled to the one or more processors. The one or more processors and the storage media of the computing system may be provided by one or more computing devices. An example computing device 500 is described below with respect to FIG. 5. The storage media stores instructions which, when executed by the computing system, cause the computing system to perform any of the above methods.

In some embodiments, one or more non-transitory media (e.g., storage media) stores instructions which, when executed by a computing system, cause the computing system to perform any of the above methods.

In some embodiments, a computing device (e.g., 500) hosts one or more hypervisors that operate on the computing device and emulate and/or virtualize computing hardware. A hypervisor can be a Type-1 (bare-metal hypervisor) or Type-2 hypervisor (hosted hypervisor), for example.

In some embodiments, a computing device employs operating system-level virtualization in addition to, or in the absence of, one or more hypervisors. With operating system-level virtualization, the operating system kernel facilitates multiple isolated user space instances sometimes referred to as containers, zones, virtual private servers, partitions, virtual environments, virtual kernels, jails, etc.

In some embodiments, multiple computing devices in a distributed computing environment performs any of the above methods. In such an environment, computing devices may be continuously, periodically, or intermittently interconnected by one or more data communications networks (e.g., one or more Internet Protocol (IP) networks.)

Example Computing Device

Figure 5:
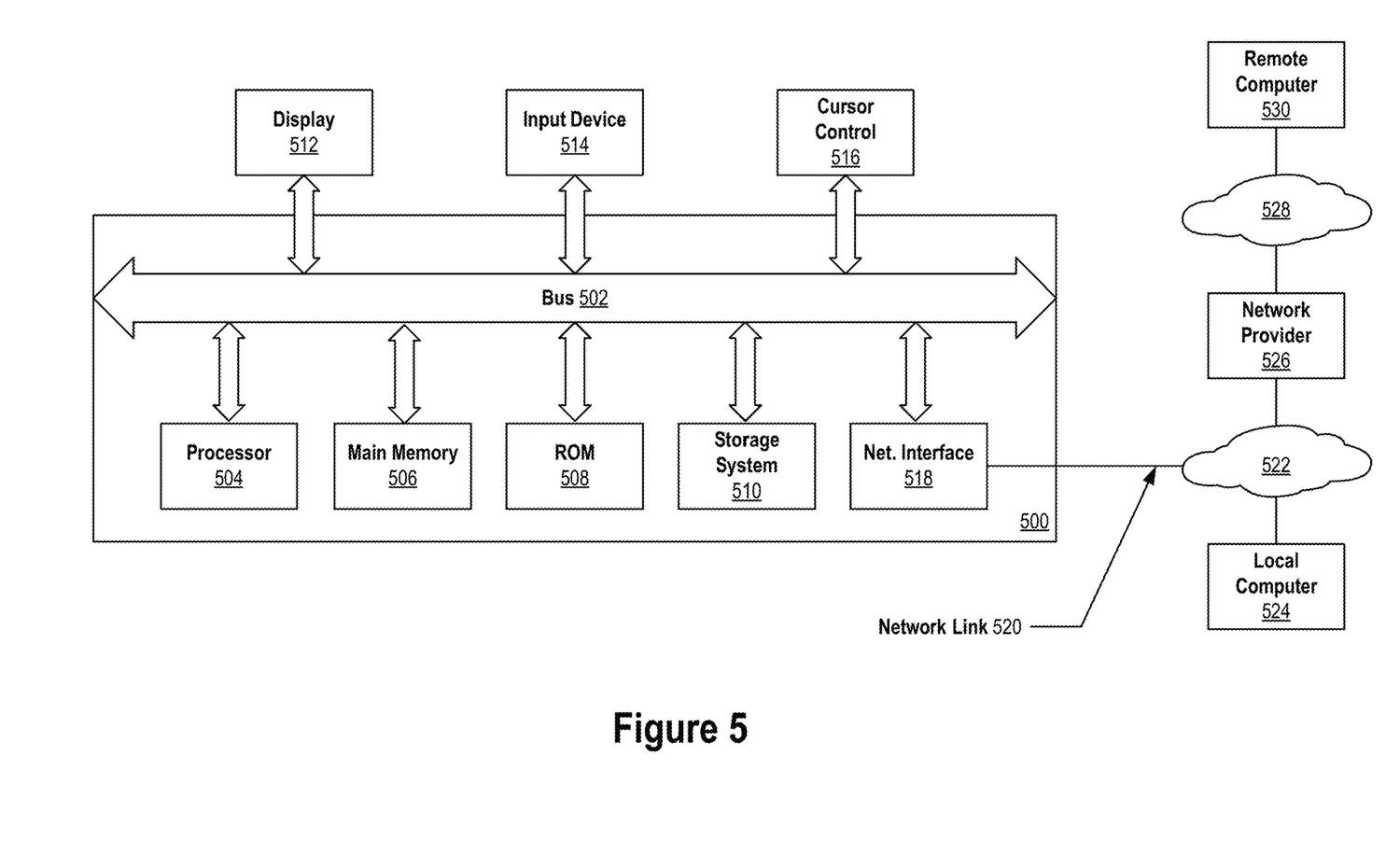
FIG. 5 illustrates an example computing device.

FIG. 5 illustrates example computing device 500 according to some embodiments. Computing device 500 includes bus 502 or other communication mechanism for communicating information, and one or more hardware processors 504 coupled with bus 502 for processing information. Computing device 500 is just one example of a possible computing device that may be used in an implementation. Other computing device configurations having more, fewer, or different components may be used in an implementation.

Hardware processor(s) 504 include, for example, one or more general-purpose microprocessors, central processing units (CPUs) or cores thereof, graphics processing units (GPUs), or systems on a chip (SoCs).

Computing device 500 also includes main memory 506, implemented by one or more volatile memory devices, coupled to bus 502 for storing information and instructions to be executed by processor(s) 504. Main memory 506 also may be used for storing temporary variables or other intermediate information during execution of instructions by processor(s) 504.

Computing device 500 includes read-only memory (ROM) 508 or other static storage device coupled to bus 502 for storing static information and instructions for processor(s) 504.

Storage system 510 implemented by one or more non-volatile memory devices is provided and coupled to bus 502 for storing information and instructions.

Computing device 500 is coupled via bus 502 to display 512, such as a liquid crystal display (LCD), a light emitting diode (LED) display, or a cathode ray tube (CRT), for displaying information to a computer user. Display 512 may be combined with a touch sensitive surface to form a touch screen display. The touch sensitive surface may be an input device for communicating information including direction information and command selections to processor(s) 504 and for controlling cursor movement on display 512 via touch input directed to the touch sensitive surface such by tactile or haptic contact with the touch sensitive surface by a user's finger, fingers, or hand or by a hand-held stylus or pen. The touch sensitive surface may be implemented using a variety of different touch detection and location technologies including, for example, resistive, capacitive, surface acoustical wave (SAW) or infrared technology.

Input device 514, including alphanumeric and other keys, is coupled to bus 502 for communicating information and command selections to processor(s) 504. Another type of user input device is cursor control 516, such as, for example, a mouse, a trackball, or cursor direction keys, for communicating direction information and command selections to processor(s) 504 and for controlling cursor movement on display 512. For example, his input device may have two degrees of freedom in two axes, a first axis (e.g., x) and a second axis (e.g., y), that allows the device to specify positions in a plane.

In some embodiments, computing device 500 in response to processor(s) 504 executing instructions contained in main memory 506 performs any of the above methods. Such instructions are read into main memory 506 from another storage medium, such as storage system 510. Execution of the instructions contained in main memory 506 may cause processor(s) 504 to perform any of the above methods. Hard-wired circuitry may be used in place of or in combination with instructions to perform any of the above methods.

The term "storage media" as used herein refers to any non-transitory media that store data and/or instructions that cause a machine to operate in a specific fashion. Such storage media may comprise non-volatile media (e.g., storage system 510) and/or volatile media (e.g., main memory 506). Non-volatile media includes, for example, read-only memory (e.g., EEPROM), flash memory (e.g., solid-state drives), magnetic storage devices (e.g., hard disk drives), and optical discs (e.g., CD-ROM). Volatile media includes, for example, random-access memory devices, dynamic random-access memory devices (e.g., DRAM) and static random-access memory devices (e.g., SRAM).

Storage media is distinct from but may be used in conjunction with transmission media. Transmission media participates in transferring information between storage media. For example, transmission media includes coaxial cables, copper wire and fiber optics, including the circuitry that comprise bus 502. Transmission media can also take the form of acoustic or light waves, such as those generated during radio-wave and infra-red data communications.

Computing device 500 also includes data communications network interface 518 coupled to bus 502. Network interface 518 may provide a two-way data communication coupling to a wired or wireless network link 520 that is connected to a local, cellular or mobile network 522. For example, network interface 518 may be IEEE 802.3 wired "ethernet" card, an IEEE 802.11 wireless local area network (WLAN) card, an IEEE 802.15 wireless personal area network (e.g., Bluetooth) card or a cellular network (e.g., GSM, LTE, etc.) card to provide a data communication connection to a compatible wired or wireless network. Network interface 518 may send and receive electrical, electromagnetic or optical signals that carry digital data streams representing various types of information.

Network link 520 provides data communication through one or more networks to other data devices. For example, network link 520 may provide a persistent, periodic, or intermittent connection through network 522 to local computing device 524 that is also connected to network 522 or to data communication equipment operated by a network access provider 526 such as, for example, an internet service provider or a cellular network provider. Network access provider 526 in turn may provide data communication connectivity to another data communications network 528 (e.g., the Internet). Networks 522 and 528 both may use electrical, electromagnetic or optical signals that carry digital data streams. The signals through the various networks and the signals on network link 520 and through network interface 518, which carry the digital data to and from computing device 500, are example forms of transmission media. Computing device 500 may send messages and receives data, including program code, through the networks 522 and 528, network link 520 and network interface 518. In the Internet example, a remote computing device 530 may transmit a requested code for an application program through network 528, network 522 and network interface 518. The received code may be executed by processor 504 as it is received, and/or stored in storage device 510, or other non-volatile storage for later execution.

CONCLUSION

For situations in which the above systems and methods collect information about users, the users may be provided with an opportunity to opt in/out of programs or features that may collect personal information (e.g., information about a user's preferences or usage of a smart device). In addition, in some instances, certain data may be anonymized in one or more ways before it is stored or used, so that personally identifiable information is removed. For example, a user's identity may be anonymized so that the personally identifiable information cannot be determined for or associated with the user, and so that user preferences or user interactions are generalized (for example, generalized based on user demographics) rather than associated with a particular user.

Although some of various drawings illustrate a number of logical stages in a particular order, stages that are not order dependent may be reordered and other stages may be combined or broken out. While some reordering or other groupings are specifically mentioned, the ordering and groupings presented herein are not an exhaustive list of alternatives.

In the foregoing detailed description and in the appended claims, although the terms first, second, etc. are, in some instances, used herein to describe various elements, these elements should not be limited by these terms. These terms are only used to distinguish one element from another. For example, a first computing device could be termed a second computing device, and, similarly, a second computing device could be termed a first computing device. The first computing device and the second computing device are both computing devices, but they are not the same computing device.

As used in the foregoing detailed description and in the appended claims, the singular forms "a," "an," and "the" are intended to include the plural forms as well, unless the context clearly indicates otherwise. As used in the foregoing detailed description and in the appended claims, the term "and/or" refers to and encompasses any and all possible combinations of one or more of the associated listed items.

As used in the foregoing detailed description in the appended claims, the terms "based on," "according to," "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As used in the foregoing detailed description and in the appended claims, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The foregoing detailed description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

The invention claimed is:

1. A computer-implemented method for generating and using a location sensitive ensemble classifier for classifying content, the method performed by a computing system having one or more processors, the computer-implemented method comprising:
    obtaining a general ensemble classifier C, which comprises a plurality of classifiers C-N, where N is a positive integer, and is trained to cover multiple regions based on a training data set T;
    dividing a validation data set V into a region set;
    wherein the region set divides the validation data set V into a plurality of regions, and each region of the plurality of regions comprises a plurality of data points of the validation data set V that fall within the region;
    generating a regional ensemble classifier for a region of the plurality of regions, wherein the regional ensemble classifier for the region is an ensemble of one or more of the plurality of classifiers C-N of the general ensemble classifier C and is generated based on the plurality of data points of the validation data set V that fall within the region; and
    classifying a content item in at least one of a plurality of classes using the regional ensemble classifier.

2. The computer-implemented method of claim 1, wherein the classifying the content item in at least one of a plurality of classes using the regional ensemble classifier for the particular region is based on determining that a test data point for the content item belongs to the particular region.

3. The computer-implemented method of claim 1, wherein dividing the validation data set V into the region set is based on generating a hyperplane set, where the hyperplane set comprises a plurality of generated hyperplanes that divides the validation data set V into the plurality of regions.

4. The computer-implemented method of claim 3, wherein the generating the hyperplane set is based on a locality sensitive hashing method.

5. The computer-implemented method of claim 1, wherein the generating the regional ensemble classifier for each region of the plurality of regions is based on applying an ensemble pruning method to the set of classifiers C-N and the plurality of data points that fall within the region.

6. The computer-implemented method of claim 1, further comprising:
selecting the region set to use to classify content based on a precision score for the regional ensemble classifier for each region of the plurality of regions, where the precision score is computed based on the plurality of data points that fall within the region.

7. The computer-implemented method of claim 1, further comprising:
selecting the region set to use to classify content based on a recall score for the regional ensemble classifier for each region of the plurality of regions, where the recall score is computed based on the plurality of data points that fall within the region.

8. The computer-implemented method of claim 1, further comprising:
selecting the region set to use to classify content based on a F1 score for the regional ensemble classifier for each region of the plurality of regions, where the F1 score is computed based on the plurality of data points that fall within the region.

9. One or more non-transitory computer-readable media storing computer-executable instructions which, when executed by a computing system having one or more processors, cause the computing system to perform:
obtaining a general ensemble classifier C, which comprises a plurality of classifiers C-N, where N is a positive integer, and is trained to cover multiple regions based on a training data set T;
dividing a validation data set V into a region set;
wherein the region set divides the validation data set V into a plurality of regions, and each region of the plurality of regions comprises a plurality of data points of the validation data set V that fall within the region;
generating a regional ensemble classifier for a region of the plurality of regions, wherein the regional ensemble classifier for the region is an ensemble of one or more of the plurality of classifiers C-N of the general ensemble classifier C and is generated based on the plurality of data points of the validation data set V that fall within the region; and
classifying a content item as low-quality using the regional ensemble classifier.

10. The one or more non-transitory computer-readable media of claim 9, wherein the classifying the content item as low-quality using the regional ensemble classifier for the particular region is based on determining that a test data point for the content item belongs to the particular region.

11. The one or more non-transitory computer-readable media of claim 9, wherein dividing the validation data set V into the region set is based on generating a hyperplane set, where the hyperplane set comprises a plurality of generated hyperplanes that divides the validation data set V into the plurality of regions, wherein the generating the hyperplane set is based on a locality sensitive hashing method.

12. The one or more non-transitory computer-readable media of claim 9, wherein the generating the regional ensemble classifier for each region of the plurality of regions is based on applying an ensemble pruning method to the set of classifiers C-N and the plurality of data points that fall within the region.

13. The one or more non-transitory computer-readable media of claim 9, further comprising instructions which, when executed by the computing system, cause the computing system to perform:
selecting the region set to use to classify content based on a precision score for the regional ensemble classifier for each region of the plurality of regions, where the precision score is computed based on the plurality of data points that fall within the region.

14. The one or more non-transitory computer-readable media of claim 9, further comprising instructions which, when executed by the computing system, cause the computing system to perform:
selecting the region set to use to classify content based on a recall score for the regional ensemble classifier for each region of the plurality of regions, where the recall score is computed based on the plurality of data points that fall within the region.

15. The one or more non-transitory computer-readable media of claim 9, further comprising instructions which, when executed by the computing system, cause the computing system to perform:
selecting the region set to use to classify content based on a F1 score for the regional ensemble classifier for each region of the plurality of regions, where the F1 score is computed based on the plurality of data points that fall within the region.

16. A computing system comprising:
one or more processors;
storage media; and
instructions stored in the storage media and which, when executed by the computing system, cause the computing system to perform:
obtaining a general ensemble classifier C, which comprises a plurality of classifiers C-N, where N is a positive integer, and is trained to cover multiple regions based on a training data set T;
dividing a validation data set V into a region set;
wherein the region set divides the validation data set V into a plurality of regions, and each region of the plurality of regions comprises a plurality of data points of the validation data set V that fall within the region;
generating a regional ensemble classifier for a region of the plurality of regions, wherein the regional ensemble classifier for the region is an ensemble of one or more of the plurality of classifiers C-N of the general ensemble classifier C and is generated based on the plurality of data points of the validation data set V that fall within the region; and
classifying a content item in at least one of a plurality of classes using the regional ensemble classifier.

17. The computing system of claim 16, wherein the classifying the content item in at least one of a plurality of classes using the regional ensemble classifier for the particular region is based on determining that a test data point for the content item belongs to the particular region.

18. The computing system of claim 16, wherein dividing the validation data set V into the region set is based on generating a hyperplane set, where the hyperplane set comprises a plurality of generated hyperplanes that divides the validation data set V into the plurality of regions, wherein the generating the hyperplane set is based on a locality sensitive hashing method.

19. The computing system of claim 16, wherein the generating the regional ensemble classifier for each region of the plurality of regions is based on applying an ensemble pruning method to the set of classifiers C-N and the plurality of data points that fall within the region.

20. The computing system of claim 16, further comprising instructions which, when executed by the computing system, cause the computing system to perform:

selecting the region set to use to classify content based on a precision score and a recall score for the regional ensemble classifier for each region of the plurality of regions, where the precision score and the recall score are each computed based on the plurality of data points that fall within the region.

* * * * *